United States Patent [19]

Bennett

[11] Patent Number: 4,826,369

[45] Date of Patent: May 2, 1989

[54] APPARATUS FOR MACHINING SPLINES ON A TUBULAR MEMBER

[75] Inventor: Charles M. Bennett, Dalkeith, Scotland

[73] Assignee: MacTaggart Scott (Holdings) Ltd., Loanhead, Scotland

[21] Appl. No.: 241,824

[22] Filed: Sep. 6, 1988

Related U.S. Application Data

[63] Continuation of Ser. No. 125,765, Nov. 23, 1987, abandoned, which is a continuation of Ser. No. 798,743, Nov. 15, 1985, abandoned.

[30] Foreign Application Priority Data

Nov. 17, 1984 [GB] United Kingdom ............... 8429125

[51] Int. Cl.⁴ .............................................. B23C 3/30
[52] U.S. Cl. .................................... 409/132; 408/79; 409/143; 409/162; 409/230; 409/307
[58] Field of Search ............... 409/25, 26, 42, 46, 409/50, 51, 58, 60, 131, 132, 143, 145, 162, 163, 177, 204, 230, 304, 307, 56, 61, 141, 218; 408/79–83

[56] References Cited

U.S. PATENT DOCUMENTS

| | | |
|---|---|---|
| 1,245,238 | 11/1917 | Jones ............................ 409/215 X |
| 1,591,874 | 7/1926 | Moore ........................... 409/197 X |
| 1,852,601 | 4/1932 | Boyer ............................ 409/143 X |
| 2,319,582 | 5/1943 | Carroll .......................... 409/143 X |
| 2,397,086 | 3/1946 | Brady ............................ 409/132 |
| 3,403,597 | 10/1968 | Beckman et al. ............. 409/143 |
| 3,709,095 | 1/1973 | Laumer .......................... 409/132 |
| 3,757,637 | 9/1973 | Eich et al. ..................... 409/230 |
| 3,916,569 | 11/1975 | Wydler et al. ................. 51/33 W |

FOREIGN PATENT DOCUMENTS

| | | |
|---|---|---|
| 0182158 | 5/1986 | European Pat. Off. . |
| 2552259 | 2/1977 | Fed. Rep. of Germany . |
| 564113 | 9/1944 | United Kingdom . |
| 649862 | 2/1951 | United Kingdom . |
| 1219081 | 1/1971 | United Kingdom . |

Primary Examiner—Gil Weidenfeld
Assistant Examiner—Steven C. Bishop
Attorney, Agent, or Firm—Stephen G. Rudisill

[57] ABSTRACT

Apparatus for machining splines on the internal surface of a tubular member comprising cutter means for forming the splines on the internal surface; a carrier for the tubular member for enabling the tubular member to be moved in an axial direction relative to the cutter means; and means for angularly indexing the cutter means relative to the tubular member whereby splines at angularly predetermined intervals can be provided around the interval circumference of the tubular member.

7 Claims, 3 Drawing Sheets

APPARATUS FOR MACHINING SPLINES ON A TUBULAR MEMBER

This is a continuation of Ser. No. 125,765 filed Nov. 23, 1987 which is a continuation of Ser. No. 798,743 filed on Nov. 15, 1985, both abandoned.

FIELD OF THE INVENTION

This invention relates to apparatus for machining splines on a tubular member. In particular, the invention is particularly, but not exclusively, applicable to the machining of internal splines on a torque tube for controlling the inclination of retractable hydroplanes on a submarine.

It has previously been proposed to mount port and starboard hydroplanes of a submarine each on an externally-splined stock. Co-operating with each externally splined stock is an internally-splined torque tube approximately 6 feet in length and approximately 12 inches in outside diameter. The cooperating splines of the stocks and torque tube permit the stocks to be rotated in unison to vary the angle of inclination of the hydroplanes in a controlled manner. In addition, the splines permit the stocks to be extended or retracted axially relative to the torque tube.

Because of the length of the torque tube, the machining of the splines is a difficult operation to effect with the accuracy which is required.

An object of the present invention is to provide an improved form of apparatus for facilitating machining of the internal splines of a tubular member such as a torque tube.

According to the present invention, there is provided apparatus for machining splines on the internal surface of a tubular member, comprising cutter means for forming the splines on said internal surface; a carrier for said tubular member for enabling the tubular member to be moved in an axial direction relative to said cutter means; and means for angularly indexing the cutter means relative to the tubular member whereby splines at angularly predetermined intervals can be provided around the internal circumference of the tubular member.

According to a further aspect of the present invention there is provided a method of machining splines on the internal surface of a tubular member comprising fixedly locating spline-forming cutter means, fixedly mounting a tubular member on a carrier for movement past said cutter means to machine said internal surface, and indexing the cutter means angularly at predetermined intervals after each pass of the carrier so as to produce splines around the internal circumference of the tubular member.

DESCRIPTION OF PREFERRED EMBODIMENTS

Embodiments of the present invention will now be described, by way of example, with reference to the accompanying drawings in which:

FIG. 1 is a diagrammatic side view of apparatus for machining splines in accordance with the present invention.

FIG. 2 is a transverse sectional view of a first form of spline cutter, for use in the apparatus of FIG. 1, and FIG. 3 is a transverse sectional view of a second form of spline cutter, for use in the apparatus of FIG. 1.

Mounted on the fixed bed 12 on guides carried thereby is a horizontally movable tube carrier 18. The carrier 18 can be moved on horizontal guides (not shown) relative to the cutter head 17 so that a tube 19 carried by the carrier 18 can be moved in relation thereto so that the cutter head 17 passes internally of the tube 19 throughout its total length.

Figure 1:
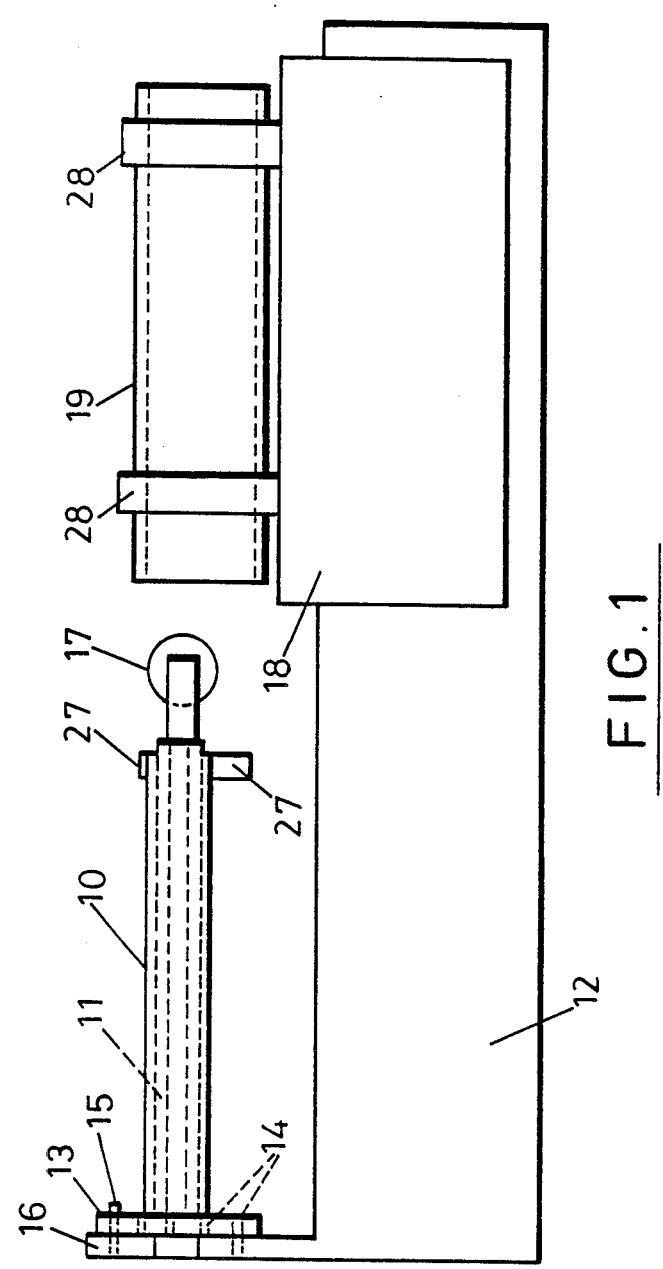
Referring to FIG. 1, there is shown apparatus for machining the internal splines of a tubular member comprising a horizontal tubular housing 10 through which extends an associated driven spindle 11. The spindle 11 is driven in any suitable well-known manner using, for example, a clutch mechanism. The housing 10 is supported on a fixed bed 12. At one end of the tubular housing 10, there is provided an integral annular indexing plate 13. The tubular housing 10 with its associated spindle 11 is rotatable about its axis for annular indexing purposes but is fixed in an axial direction. The indexing plate 13 is provided with a plurality of annularly-spaced indexing holes 14 which co-operate with a retractable plunger 15 mounted on an extension 16 of the fixed bed 12. By insertion of the plunger 15 into one of the holes 14, the housing 10 can be releasably fixed relative to the bed 12. The spindle 11 drives a cutter head 17 which is carried at that end of the spindle remote from the indexing plate 13.
Figure 2:
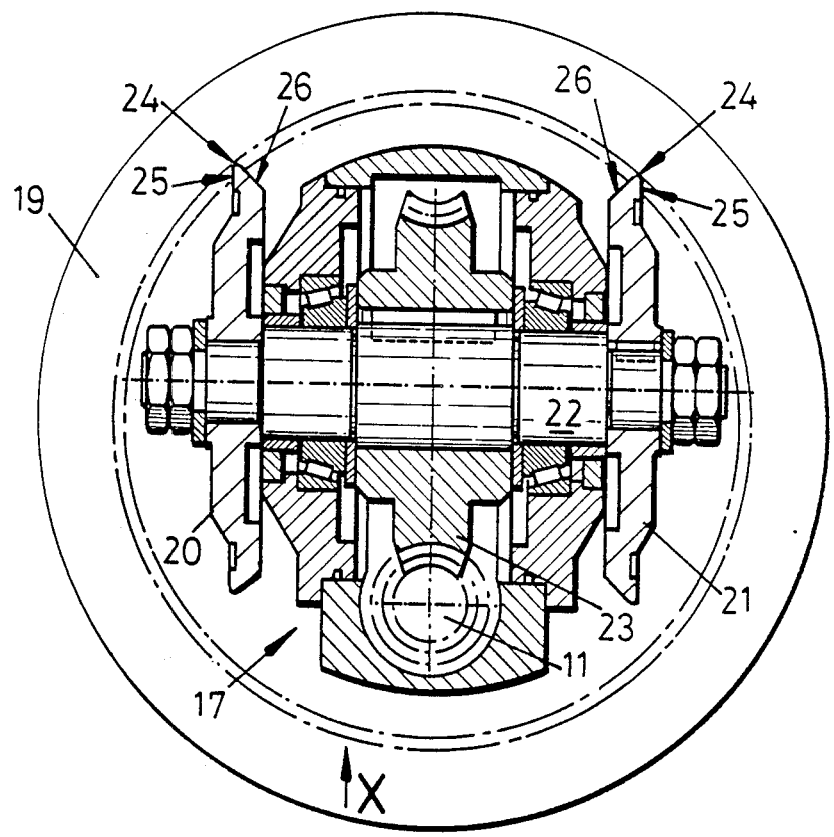

As shown in FIG. 2, the cutter head 17 comprises a pair of parallel circular rotatable cutters 20, 21 carried on a common shaft 22 and driven by spindle 11 through a suitable worm gearing 23 carried by shaft 22. The peripheral cutting edge 24 of each cutter 20, 21 has an external face 25 which is normal to the axis of the shaft 22 on which the cutters 20, 21 are mounted. An adjoining face 26 of each cutting edge 24 is angled relative to the first face 25 at an angle dictated by the profile of the splines to be cut. The angle of the cutter 20 is opposite to that of the cutter 21. The cutter head 17 is hydraulically movable towards or away from the tube 19 being machined in the direction of arrow X in order to control the depth of penetration (i.e. the cutting depth) of the cutters 20, 21 into the internal surface of the tube 19 being machined. Also the forward end of the housing 10 is provided with radially adjustable hydraulically operable stabilizing pads 27 (FIGS. 1 and 3) which, during use, are urged against the internal surface of the tube 19 in order to rigidify the cutter head 17 during a machining operation.

In operation of the apparatus, the depth of cut of the cutters 20, 21 is adjusted to give the required depth of cut. The tube 19 which is to be machined internally is then mounted on the carrier 18 where it is held in position by a pair of spaced clamps 28 which surround the tube 19 and clamp it thereto. The carrier 18 is then moved relative to the cutter head 17 so that the cutter head is applied to the internal surface of the tube 19. The carrier 18 is then traversed in the horizontal direction so that the cutters 20, 21 machine the internal surface of the tube along its full length. In this operation, due to the profile of the cutting surfaces of each cutter, each cutter 20, 21 machines one half of a groove between adjacent internal splines. On completion of a longitudinal traverse, the carrier 18 is then withdrawn to its starting position, the cutter head 17 is indexed to the next annular position by means of the index holes 14 in the indexing plate 13 on the tubular housing 10 and the co-operating plunger 15 in the extension 16 of the fixed bed 12. A further traverse of the carrier 18 relative to the cutter head 17 is then effected. Similar operations are then repeated until the two cutters indexed angular intervals on the complete circumference of the interior of the tube. It will be understood that the relative position of the two cutters 20, 21 is critical. As previously indicated, a cutter machines one half of a spline on each pass. Because the cutting edges of the two cutters are angled oppositely to each other, each cutter 20 or 21 will machine the other half of a spline of which the first half has been machined by the other cutter so that on completion of a complete revolution of the cutter head 17, complete splines will have been machined at the intervals dictated by the indexing mechanism.

Figure 3:
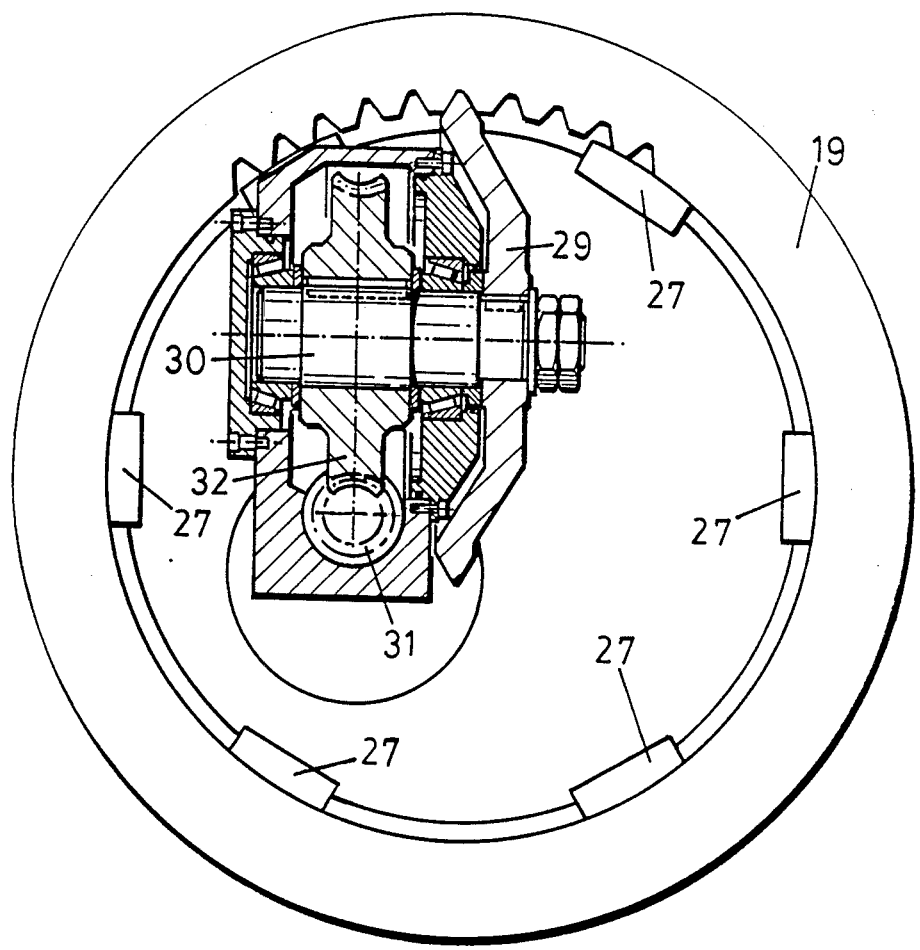

In an alternative form of cutter head as shown in FIG. 3, which is particularly suitable for the machining of involute splines, the cutter head 17 incorporates a cutter 29 having a cutting profile which machines the whole of a groove in a single pass. In this case, the single cutter 20 is mounted on a shaft 30 driven by spindle 31 through worm gearing 32 carried by the shaft 30. In this case, the cutter head is positioned so that the actual effective cutting surfaces of the cutter operate substantially on a plane lying along a radius of the tube 19 being machined. Apart from the provision of a single cutter 29, the embodiment shown in FIG. 3 operates in an analogous manner to the embodiment shown in FIG. 2.

In an alternative arrangement, it may be convenient to move the cutter head axially relative to the tube carrier which is stationary. In this case the tube can be indexed angularly relative to an angularly fixed cutter head.

I claim:

1. Apparatus for machining splines on an internal surface of an elongated tubular member having a bore; said apparatus comprising elongated cutter means for forming the splines on said internal surface; a carrier for said tubular member; carriage means for effecting relative axial movement between the tubular member and the cutter means, said cutter means comprising a drivable cutter head and a radial indexing flange operatively connected to said cutter adjacent that end of the cutter means remote from the cutter head; angular indexing means for effecting angular indexing of the indexing flange and associated cutter head relative to the tubular member whereby splines can be provided at a plurality of predetermined, angular intervals around the internal circumference of the tubular member, said splines extending over at least a substantial portion of the length of said member; and stabilizing means carried by said cutter means and adapted to be radially expanded into engagement with the inner surface of the tubular member being machined in order to rigidify the cutter means during a cutting operation.

2. Apparatus as claimed in claim 1, in which the stabilizing means comprises radially adjustable pad means disposed circumferentially about said inner surface and carried by the cutter means towards that end thereof remote from the indexing flange.

3. Apparatus as claimed in claim 1, in which the cutter means is carried on a mounting provided on a fixed bed and the radial flange of said cutter means is integral therewith, and said mounting and said flange are each provided with a series of angularly spaced holes capable of being brought into register to enable a locking element to be releasably inserted in order to locate the cutter means in a predetermined angular position relative to the mounting.

4. Apparatus as claimed in claim 1, in which the cutter means comprises a pair of annular rotary cutters, each of said cutters having a cutting profile such that one cutter forms one half of the profile of a spline and the other cutter forms the other half of the spline profile on further indexing of the cutter means.

5. Apparatus as claimed in claim 1, in which the cutter means comprises a single annular rotary cutter which forms each spline profile in a single pass.

6. Apparatus as claimed in claim 1, in which the carrier for the tubular member has a transverse which enables a tubular member carried thereby to be machined along the full length thereof.

7. A method of machining splines on the internal surface of an elongated tubular member comprising locating spline-forming cutter means incorporating a cutter head for movement relative to the tubular member to machine splines on said internal surface, and indexing the cutter head by means of a radial indexing flange connected to said cutter head at that end of the cutter means remote from the cutter head whereby the cutter head can be indexed angularly at predetermined intervals after each pass so as to produce splines around the internal circumference of the tubular member and stabilizing the cutter means against the tubular member during a cutting operation.

* * * * *